United States Patent
Waclawsky et al.

[19]

[11] Patent Number: 5,946,302
[45] Date of Patent: Aug. 31, 1999

[54] SYSTEM AND METHOD FOR RESPONSE TIME MEASUREMENT IN HIGH SPEED DATA TRANSMISSION NETWORKS

[75] Inventors: John G. Waclawsky, Frederick, Md.; Paul C. Hershey, Manassas, Va.

[73] Assignee: International Business Machines Corporation, Armonk, N.Y.

[21] Appl. No.: 09/054,127

[22] Filed: Apr. 2, 1998

Related U.S. Application Data

[62] Division of application No. 08/496,622, Jun. 29, 1995, Pat. No. 5,802,302.

[51] Int. Cl.$^6$ .................................................. G06F 13/00
[52] U.S. Cl. ........................ 370/252; 370/253; 395/200.54
[58] Field of Search .................................. 370/252, 253; 395/853, 854, 200.54

[56] References Cited

U.S. PATENT DOCUMENTS

| | | | |
|---|---|---|---|
| 4,817,080 | 3/1989 | Soha | 370/252 |
| 4,905,171 | 2/1990 | Kiel et al. | 364/551.01 |
| 5,021,949 | 6/1991 | Morten et al. | 364/200 |
| 5,095,444 | 3/1992 | Motles | 370/13 |
| 5,121,345 | 6/1992 | Lentz | 364/550 |
| 5,138,607 | 8/1992 | Thiebaut et al. | 370/13 |
| 5,206,888 | 4/1993 | Hiraguchi et al. | 364/579 |
| 5,226,041 | 7/1993 | Waclawsky et al. | 370/60 |
| 5,274,815 | 12/1993 | Trissel et al. | 395/700 |
| 5,274,819 | 12/1993 | Bloomfield-Brown | 395/700 |
| 5,307,351 | 4/1994 | Webster | 370/94.1 |
| 5,319,776 | 6/1994 | Hile et al. | 395/575 |
| 5,343,465 | 8/1994 | Khalil | 370/253 |
| 5,365,514 | 11/1994 | Hershey et al. | 370/241 |
| 5,375,070 | 12/1994 | Hershey et al. | 364/550 |
| 5,526,488 | 6/1996 | Hershey et al. | 395/200.72 |
| 5,590,116 | 12/1996 | Zhang | 370/252 |

FOREIGN PATENT DOCUMENTS

| | | |
|---|---|---|
| 5108026 | 2/1954 | Japan . |
| 3230243 | 10/1991 | Japan . |
| 4130555 | 5/1992 | Japan . |
| 6179341 | 4/1996 | Japan . |

*Primary Examiner*—Chi H. Pham
*Assistant Examiner*—Frank Duong
*Attorney, Agent, or Firm*—John D. Flynn; Morgan & Finnegan

[57] ABSTRACT

A high speed data communication network is adapted to monitor and measure response time between a work station and a central host or processor coupled to the data communications network through a media, such as token ring, FDDI, Ethernet, etc. As the workstation communicates with the processor, a flag is set in a packet transmitted to the processor. The packet traverses the network to an application in the processor and a response returns which includes a flag. Each flag is a specific bit pattern. A programmable digital filter recognizes the flags and counts the number of bits on the network between the flags in the forward and reverse direction. By counting the bits on the media, when the flag moves in one direction or another, the total number of bits transmitted on the media between the two intervening flags is determined. The media speed is used as a clock. The number of bits counted divided by the media speed determines the response time with fine resolutions. All of the measurements are done in near real time without the use of clocks or off-line processing of data to determine response time. The measurements can be done for half duplex or full duplex operation of a network. The measurements can be also used in the network to initiate performance changes according to the response time.

5 Claims, 3 Drawing Sheets

SYSTEM AND METHOD FOR RESPONSE TIME MEASUREMENT IN HIGH SPEED DATA TRANSMISSION NETWORKS

CROSS REFERENCE TO RELATED APPLICATION

This application is a division of application Ser. No. 08/496,622, filed Jun. 29, 1995 and issued Sep. 1, 1998, as U.S. Pat. No. 5,802,302, hereby incorporated by reference.

BACKGROUND OF THE INVENTION

1. Field of the Invention

This invention relates to high speed data transmission networks. More particularly, the invention relates to response time measurement, in real time, for any individual transaction in a high speed data transmission network.

2. Description of the Prior Art

In many communications environments, billing customers for network usage is important, particularly the ability of a network to respond to a transaction in a timely manner. For example, a workstation could be part of a business where customers come in to make airline reservations. It is important that the reservation request receive a prompt response from a central processing center. Not only is the return information important to the customer, the response time is important to the system operator to provide an efficient dispatching of the requests. Moreover, service agreements between travel agencies and reservation systems require a quality of service and timely network response. A system and method which monitors in real time the response time characteristics of the data processing environment will provide information on the quality of service provided by the network. Also, the information can assist in establishing a better path through the communications network or more efficient dispatching of applications at the host to meet service agreement requirements.

In the prior art, the following patents are related to the problem addressed by the present invention:

U.S. Pat. No. 5,226,041 issued Jul. 6, 1993, describes a method for simulating dynamic behavior in a communications network. The number of data packets per time period are calculated and used to compute the duration needed to transmit all remaining packets. The '041 patent does not provide a system or method for measuring response time in a communication network.

U.S. Pat. No. 5,095,444 issued Mar. 10, 1992, describes measuring the internodal transmission delay in a network and not the response time to a transaction in such a network.

U.S. Pat. No. 5,307,351 issued Apr. 26, 1994, describes a data communication network which allows an adjustment of frame length so that an optimal frame size can be generated in a network to deal with the bit rate occurring in the network. While controlling frame size impacts response time, the '351 patent does not measure response time directly as required for enforcing service agreements in transaction systems.

U.S. Pat. No. 4,905,171 issued Feb. 27, 1990, discloses a performance monitor for locating performance bottlenecks and not the response time for each transaction in a communications network.

U.S. Pat. No. 5,206,888 issued Apr. 27, 1993, describes a start-stop synchronous communications speed detecting apparatus capable of detecting a communication speed without performing any software processing. The '888 patent is directed to measuring communication speed and not the response time of transactions in communication networks U.S. Pat. No. 5,138,607 issued Aug. 11, 1992, discloses the measuring throughput of virtual circuits and not the response time of transactions in a network.

Summarizing, the prior art does not address the problem of response time measurement for any transaction in a data communications network. Moreover, the prior art does not disclose or address systems or methods for measuring response times in real time without the use of clocks. The measurement of response time in real time in data communications networks without requiring the capture of information to disk and post-processing will lower costs and improve the accuracy of measuring and modifying network performance. Such measurement information will also enable better enforcement of service agreements for customer use of such networks.

SUMMARY OF THE INVENTION

An object of the invention is a system and method for response time measurement, in real time, for any individual transaction in a communications network.

Another object is a system and method for determining the average transaction response time in a communications network without the use of external clocks or processors.

Another object is a system and method for measuring in real time the minimum and maximum frame times for any individual transaction over a measurement time interval.

Another object is a system and method to monitor workstations on various media to determine, in real time, the behavior of workstations in terms of minimum/maximum response times for applications executed by such workstations.

Another object is a system and method of measuring response time for transactions in full or half duplex communication networks.

These and other objects, features and advantages are accomplished in a communications network for monitoring and measuring response times between an end unit interacting with a processor through a data communications network in a series of transactions. The network includes means for establishing measurement or reference marks, typically referred to as flags in both a first message sent by the end unit to the processor and a second message returned to the end unit by the processor. A programmable digital filter attached to the network includes means for recognizing the flag in the first message and the flag in the second message. The filter includes further means for counting data bits on the network in a measurement time interval or the time period between the first and second flags. As the end units communicate with the processor, a flag is set in a packet transmitted to the processor. The packet traverses the network to the application executed by the processor and a response returns. The flag is a specific bit pattern. For example, the flag could be an account code, an address, a user ID, or the flag could be a specific type of protocol header. The digital filter has the further ability to count the number of bits between flags in the forward and reverse directions. By counting bits on the media when the flag moves in one direction or another, the total number of bits transmitted on the media between the two intervening flags is determined. The media speed is used as the clock. The number of bits counted is divided by the media speed to determine the response time with fine resolution. The digital filter is further adapted to have counters which count the minimum number of bits, maximum number of bits, the total number of bits, and the number of flags seen in both on the media between the end unit and the processor. From the counter information the minimum response and the maximum response for each transaction on the network can be determined. The average response time can be determined by the total number of bits counted. By counting the number of flags in one direction or the other between the end unit and the processor, the average response time can be obtained for the network. All of the measurement is done in real time without the use of clocks or off-line processing of data to determine response time.

DESCRIPTION OF THE DRAWING

These and other objects, features and advantages will be more fully apprehended from the following drawing description.

DESCRIPTION OF THE PREFERRED EMBODIMENT

Figure 1:
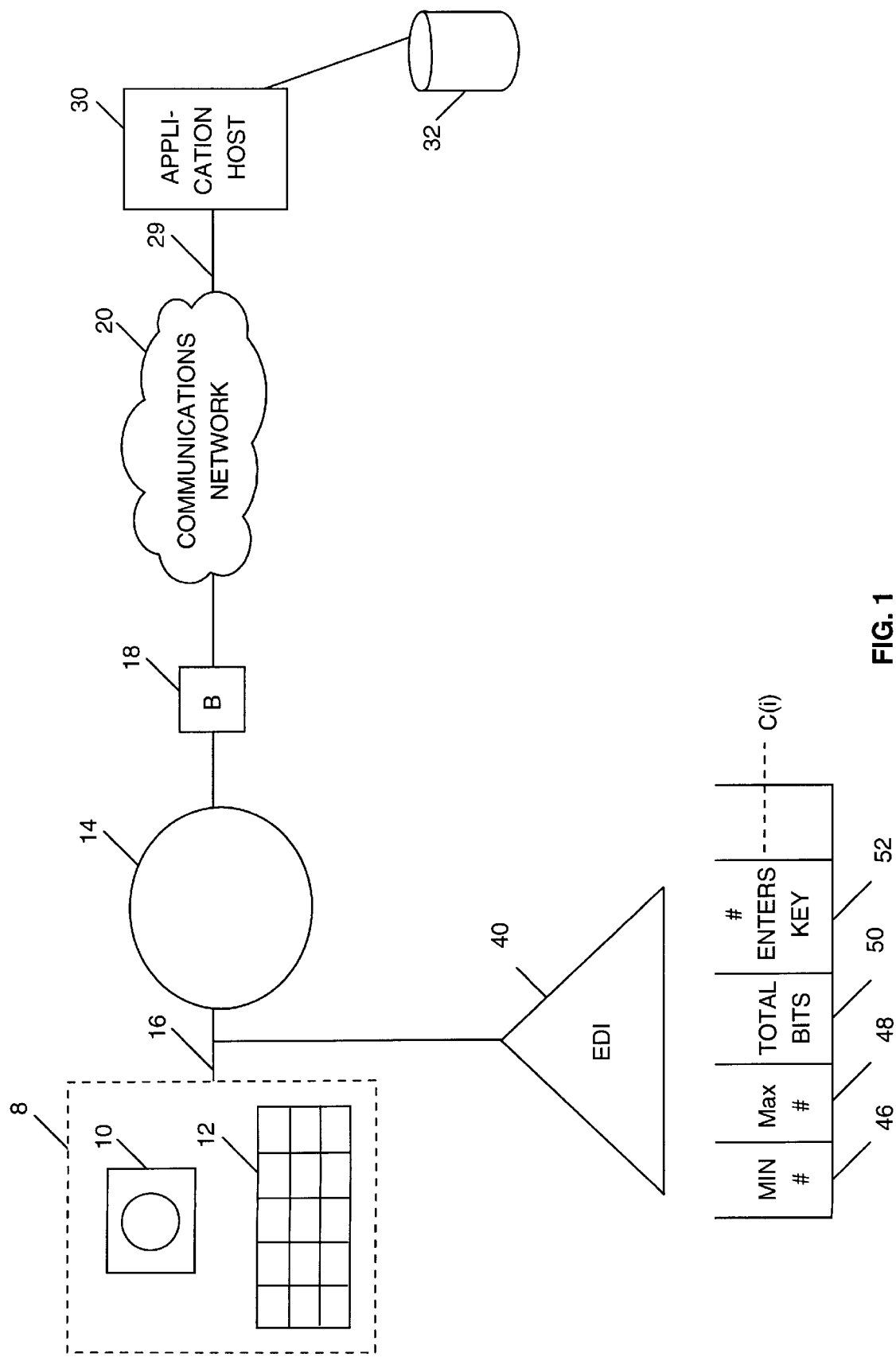
FIG. 1 is a block diagram of a communications network incorporating the principles of the present invention.

In FIG. 1, an end unit or workstation 8 includes a display 10 and keyboard 12. The workstation includes an adapter (not shown) and is coupled through bus 16 to a token ring 14. The token ring is connected through a bridge 18 to a communications network 20. A link 29 connects the network to a processor or application host 30 including a storage means 32. The host 30 runs a database application and obtains information from the direct access storage device 32. The workstation 8 interacts with the application host through the token ring in a communications network. The workstation 8 initiates a request for information from the application host, such as an airline reservation request and transmits the request through the bus 16, ring 14, bridge 18, and the communications network 20 to the host 30. The storage device 32 is interrogated by the host for the information requested by the workstation 8. The host transmits the response to the request back to the workstation through the link 29, network 20, bridge 18, token ring 14 and bus 16.

The message sent by the workstation 8 to the host 30 and the response that comes back is in standard network frame format. The frame may consist of a flag field (which could be an origin and destination field). These flag fields or origin and destination fields enable the message to be tracked for measuring purposes. One measurement of importance to users of communication network is the response time or the time it takes for data or a message to go from the workstation 8 through the token ring communications network to the host for processing by the host and return to the workstation. The response time information can be used to validate service level agreements between the owner of the workstation and the communications network and/or the application host. With the response time information, control information can be generated to provide better path selection through the communication network or more efficient dispatching of applications at the host to meet the service level agreements.

A mechanism for measuring response time without the use of clocks or external processors is a programmable digital filter, such as an Event Driven Interface (EDI) 40 coupled to the bus 16 between the token ring and the workstation. The Event Driven Interface is more fully described in U.S. Pat. No. 5,375,070, issued Dec. 20, 1994 and U.S. Pat. No. 5,365,514, issued Nov. 15, 1994, both patents assigned to the assignee of the present invention, and the disclosures thereof incorporated herein in their entirety. The EDI, as programmable a digital filter, is configured into a tree, each branch of the tree corresponding to a unique pattern of bits such as a flag set in a packet by an application or individual. At the bottom of the tree are a series of counters, each including storage means or buckets. A counter 46 measures the minimum number of bits on the bus 16 between a reference event, such as a flag in a data packet sent to the host and a flag in a packet returned to the workstation after processing. A counter 48 counts the maximum number of bits on the bus between the flags sent by the workstation 8 and the application host 30. A counter 50 counts the total number of bits on the bus between flags in a measurement time interval or preselected time period. A counter 52 counts the number of messages sent to the host and returned to the workstation. When these counters are divided by the media speed on the ring 14, the minimum response time can be obtained from the counter 46 while the maximum response time can be obtained from the counter 48. When the counter 50 and 52 are divided, the average number of bits is obtained for an enter key sending a request to the host and the screen returning from the host. The average number of bits for that event divided by the media speed provides the average response time for the system.

Figure 2A:
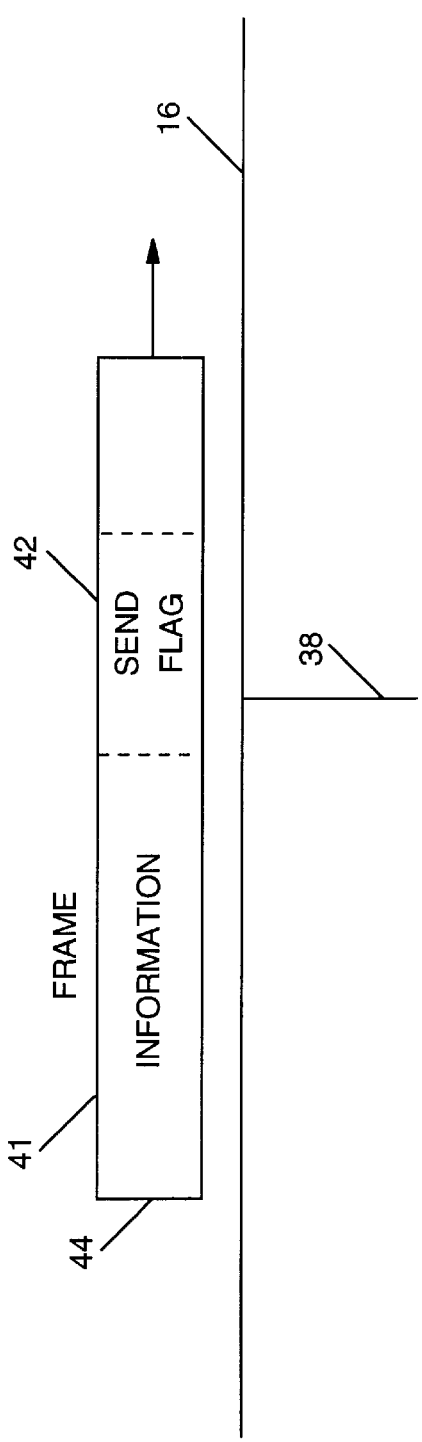
FIG. 2(a) is a representation of a data frame including a flag sent to a central host or processor in FIG. 1.
Figure 2B:
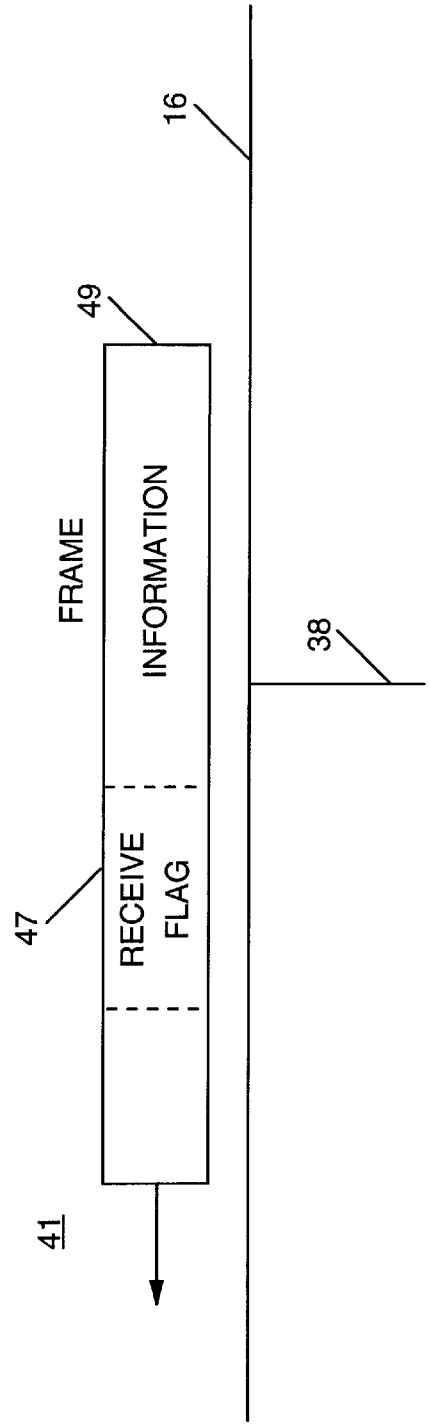
FIG. 2(b) is a representation of a data frame returning to an end unit from the central host.

In FIG. 2A, a data packet 41 or frame includes a send flag 42 which is set in the packet by an application or an individual and an information field 44. The packet traverses the network to an application or to an individual and returns to the workstation in a data packet which includes a receive flag 47 and an information field 49 shown in FIG. 2B. Each flag is a specific bit pattern. For example, the flag could be an account code, an address, a user ID or the flag could be a specific type of protocol header. The flag pattern is recognized by the EDI. When the particular flag occurs, the EDI can count the number of bits on the bus 16 between the flags in the forward and reverse directions for shared media, such as token ring, Ethernet, IEEE 802.3 and FDDI. The EDI can also perform the functions of recognizing flags and counting bits therebetween on point-to-point networks. By counting the bits on the media, the EDI indicates how many total bits have been transmitted on the media between the two intervening flags. Media speed is used as a clock. If the number of bits counted is divided by the media speed, the response time for a particular transaction, is obtained to a very fine resolution. Response times can be obtained as low as microseconds or even nanoseconds if the media speed is fast enough.

The EDI may be relocated to other positions in the network. For example, EDI could be attached to the link 29 which would permit the EDI to monitor the quality of service at the application and the rate of which requests come into the application. The EDI can also be used to determine how quickly response requests are turned around by the database and returned to the workstation through the network. Further, the EDI can generate a control vector for the application or control units in the token ring and/or network for better path selection through the communications network or more efficient dispatching of applications at the host. The system shown in FIG. 1 is adapted for half duplex operation on the bus 16.

Figure 3:
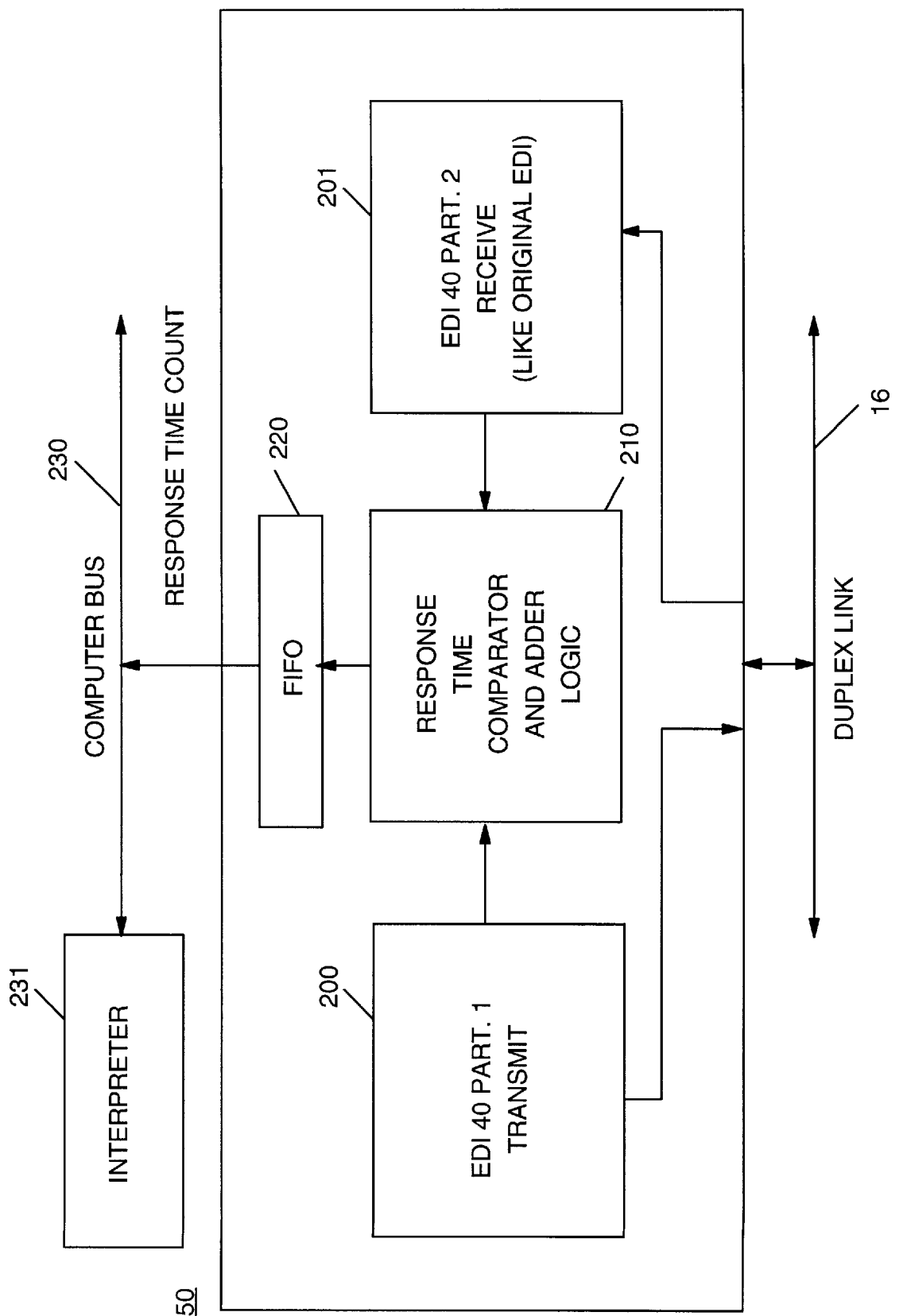
FIG. 3 is a block diagram of an event driven interface (EDI) incorporated in the network of FIG. 1 as a digital filter for full or half-duplex operation of the network.

Turning to FIG. 3, a system is shown for full duplex operation. To perform full duplex operation, an EDI 40 is arranged in two partitions, 200 and 201. The partition 200 is adapted to process transmitted data packets from the workstation 8 and recognize transmit bit flag patterns. The partition 201 is adapted to process receive patterns from the host and recognize receive flag patterns. The partitions are both coupled to a comparator and adder logic unit 210. The unit 210 calculates the response time for the network in the manner described for the EDI 40. A buffer or FIFO 220 collects a count of the number of bits that traversed the media between flags. This count represents the response time information for a measurement time interval. The purpose of the FIFO is to ensure continuous operation and no loss of information during the measurement time interval. Once the number of bits between the flags is determined, the FIFO is loaded. During the time the data is loaded into the FIFO, the EDI partitions 210 and 220 collect further bit count information. At the end of the measurement time interval period, the FIFO is emptied onto a bus 230 coupled to an interpreter 231 for initiating control action on the network based upon the response time provided by the EDI partitions 200 and 201. The partitioned EDI and response time calculator 210 accomplish near real time interpretation of response time on the network.

While specific embodiments of the invention have been described and disclosed, it will be understood by those having skill in the art that changes can be made to the specific embodiments without departing from the spirit and scope of the invention.

We claim:

1. A system for monitoring and controlling a data communication network including an end unit interacting with a processor and operating at a media speed, comprising:

a) a full duplex connection between the end unit and the processor;

b) a programmable digital filter arranged in first and second partitions and coupled to the full duplex connection;

c) the first partition processing data bits and flags transmitted on the network by the end unit;

d) the second partition processing data bits and flags transmitted by the processor;

e) a calculating unit connected between and responsive to inputs provided by the first and second partitions, the calculating unit providing an output representative of the network response time; and f) means for initiating control action on the network based upon the network response time output.

2. The system of claim 1 further comprising:

a) a buffer connected between the control action means and the output of the programmable digital filter.

3. The system of claim 2 further comprising:

a) means connected to the calculating unit for loading the buffer with data from one of the partitions while collecting new data on the full duplex connection.

4. The system of claim 3 wherein:

a) the calculating unit calculates the response time of the network by counting data bits transmitted by the network in a measurement interval and dividing the counted data bits by the network media speed.

5. In a system for monitoring and controlling a data communication network including a programmable digital filter and a full duplex connection between an end unit interacting with a processor through the network, the network operating at a media speed, a method for calculating the response time of messages transmitted between the end unit and the processor, comprising the steps of:

a) transmitting message between the end unit and the processor using the full duplex connection therebetween;

b) partitioning the programmable digital filter in first and second partitions and coupling the partitions to the full duplex connection;

c) processing data bits and flags in messages transmitted on the network by the end unit using the first partition;

d) processing data bits and flags transmitted in messages on the network by the processor using the second partition;

e) providing an output representative of the network response time from the first and second partitions using a calculating unit coupled to the first and second partitions; and f) initiating control action on the network using the calculated network response time output.

* * * * *